W. H. WILSON.
LATERAL MOTION CAR TRUCK.
APPLICATION FILED JUNE 23, 1913.
1,085,655.
Patented Feb. 3, 1914.
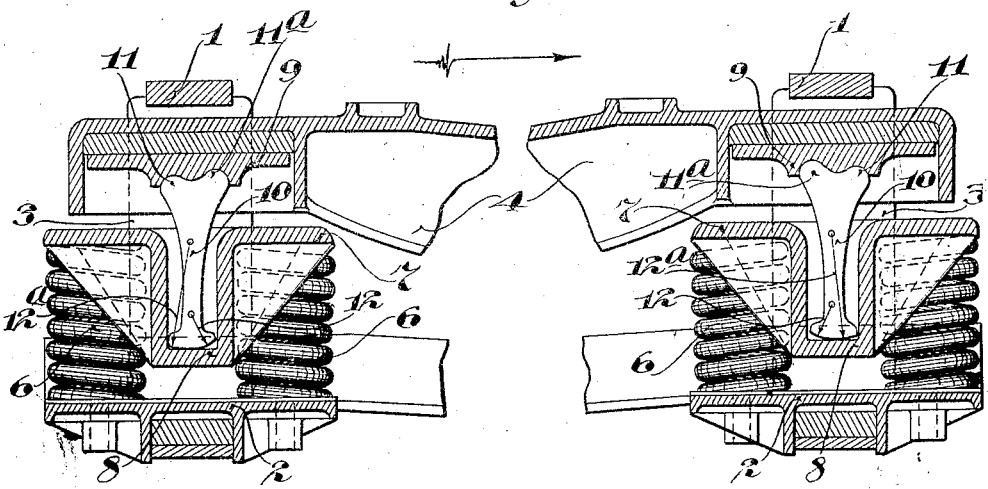
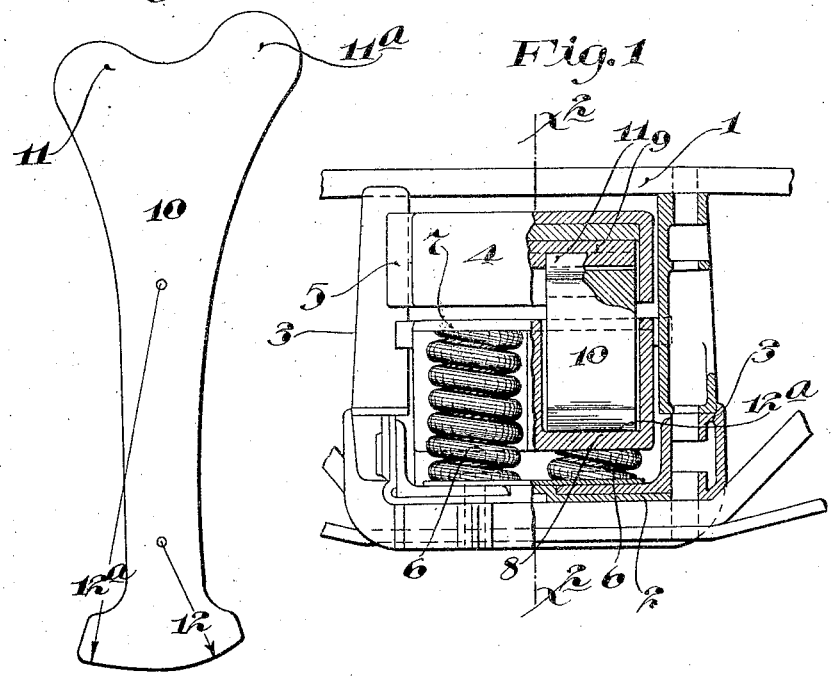
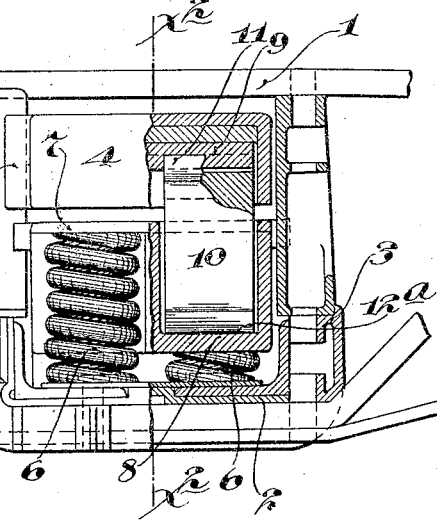
Witnesses
E. C. Skinkle
Geo. Knutson
Inventor
W. H. Wilson
By his Attorneys
Williamson & Merchant

UNITED STATES PATENT OFFICE.

WILLIAM H. WILSON, OF ST. PAUL, MINNESOTA.

LATERAL-MOTION CAR-TRUCK.

1,085,655.

Specification of Letters Patent.   Patented Feb. 3, 1914.

Application filed June 23, 1913. Serial No. 775,199.

*To all whom it may concern:*

Be it known that I, WILLIAM H. WILSON, a citizen of the United States, residing at St. Paul, in the county of Ramsey and State of Minnesota, have invented certain new and useful Improvements in Lateral-Motion Car-Trucks; and I do hereby declare the following to be a full, clear, and exact description of the invention, such as will enable others skilled in the art to which it appertains to make and use the same.

My present invention relates to car trucks of the type wherein provision is made for lateral motion of the car body in respect to the truck frame, and is directed to an improvement on a form of lateral motion devices disclosed and claimed in my co-pending application, Serial Number 775,198, filed of date, June 23rd, 1913, and entitled "Lateral motion car truck."

The general purposes of a lateral motion device of this character are fully set forth in the introductory part of my said co-pending application, and also, in my prior Patent No. 1,057,990, of date, April 1st, 1913, also entitled "Lateral motion car truck."

In the accompanying drawings which illustrate the present invention, like characters indicate like parts throughout the several views.

Referring to the drawings, Figure 1 is a fragmentary view in side elevation, showing portions of a car truck having my invention incorporated therein, some parts being sectioned; Fig. 2 is a transverse vertical section taken through the truck on the line $x^2$ $x^2$ on Fig. 1, some parts being broken away; and Fig. 3 is a detail view in elevation showing one of the lateral motion rockers on a much larger scale than the other views.

In so far as my present invention is concerned, the truck frame may be of any approved construction or suitable type. The same statement is true in respect to the truck bolster. In the particular form of the truck illustrated, however, the numeral 1 indicates the truck side frames, which includes saddle plates 2 and columns 3. In Fig. 1, the column bolts are not shown, but will be applied in the usual way. The truck bolster is indicated as an entirety by the numeral 4. This bolster, as is usual in this type of truck, works between the columns 3 and is provided with suitable stops 5 that are spaced transversely of the truck a distance greater than the transverse width of the columns, so that they are adapted to engage the column 3 to limit the endwise movements of the truck bolster transversely of the truck.

Groups of coiled springs 6, as shown, four in each group, are suitably seated in the saddle plates 2 of the truck side frames, and each group of springs supports a so-called lower rocker bearing 7. These rocker bearings 7 are provided, between the inside and outside springs 6, with depending pockets 8. The said rocker bearings 7 are guided for vertical movements on the columns 3, so that while they are free to move vertically, in respect to the truck side frames, they will partake of the lateral movements of the truck frame.

Upper rocker bearings 9 are, as shown, seated in suitable pockets in the ends of the bolster 4, so that they partake of the vertical movements of said bolster, and also of the lateral movements thereof, that is, the endwise movements of said bolster, transversely of the truck.

Three-point rockers 10, which are integral or solid metal structures, are interposed between the lower bearings 7 and upper bearings 9. These rockers 10 are preferably arranged in pairs and their lower ends are seated on the flat bottoms of the pockets 8 of the lower rocker bearings 7. At their upper ends, the rockers 10 are provided with two-point contacts or bearing lugs 11—11$^a$ that normally engage seats in the under side of the upper rocker bearings 9. The said bearing lugs 11—11$^a$ are, of course, on opposite sides of a vertical line drawn axially, or centrally through the rocker. For a highly important purpose which will be hereinafter more fully explained, the inner lugs 11$^a$ are extended to points concentrically higher than the lugs 11. Also, for an important purpose, the lower ends of the lugs 10 are extended on curved lines 12—12$^a$. The radius of the outwardly extended curve 12$^a$ is very much greater than the radius of the inwardly extended curve 12, so that the former in a direction away from the central axis of the rocker spreads or recedes downwardly from the obliquely opposite bearing lug 11$^a$ much faster than does the inwardly extended curved surface 12 recede or spread from the obliquely opposite outer bearing lug 11.

Fig. 2 illustrates the normal operative positions of the upper and lower rocker bearings and of the bolster. In this position, the rockers have the greatest stability, that is, gravity re-acts with the maximum force to hold the said rockers against oscillating movements from normal positions. Stated in another way, these three-point rocker bearings, when in central positions, give the greatest normal stability against continuous lateral swaying movements to the car body, and this resistance to lateral movement decreases as the rockers are oscillated in the one direction or the other from their normal or central positions.

When the rockers 10 are oscillated, there is a traveling or rolling engagement between the lower ends thereof in the bottoms of the pockets 8 of the lower rocker bearings 7. When the car, traveling a curve at speed sufficiently high to produce a thrust of the flanges of the outer wheels against the outer rails of the curved track section, the car body will be thrown outward by centrifugal force, for example, in the direction of the larger arrow marked on Fig. 2, and this will cause the relatively high lug 11ª of the outer rocker to become the supporting member at that side, and the relatively low lug 11 of the inside rocker to become the supporting lug for that end of the bolster which is at the inner side of the curve. The obvious result of this will be to raise that end of the bolster, which is at the outer side of the curved track, much faster or more in extent than the opposite or inside end of the said bolster. The well known reason for raising the outer rail of a curved track higher than the inner rail is to overcome, to a considerable extent, the objectionable outward thrust of the car body due to centrifugal force in traveling a curved track at high speed; and it is evident that this accelerated rise of the so-called outer end of the bolster, produced by the differentially and reversely acting rockers, further assists in accomplishing the above noted desired result. It is also evident that the above described action on the bolster will be transmitted to the car body which is carried on the truck bolster. In fact, the bolster in a broad sense, is a body member supported by the rockers, and, in one way or another, supporting the car body proper.

It is, of course, evident that the reversed arrangement of the differentially acting rocker produces a like action on the one side o the other of the car running on tracks which curve either to the right or to the left, the accelerated rise being in either case at that end of the bolster which is toward the outer side of the curved track.

The above accelerated action is further increased by the differentially curved portions 2— ˢ on the lower ends of the rockers. The ᴏot surface 12 of the relatively small curve and the obliquely opposite relatively low lug 11 of the one rocker will be thrown into action and the foot surface 12ª or relatively larger curve will be thrown into action when the relatively high lug 11ª is thrown into action. Of course, in view of the reversed arrangement of the rockers, the said portions 11—12 of the one rocker will be thrown into action when the said portions 11ª—12ª of the other rocker are thrown into action.

With the construction above described, a very highly desirable lateral motion device, meeting the various requirements of the railway service, is provided. By providing the lower bearing member 7 with pockets depressed between the springs, it is made possible to use long rockers and at the same time, to keep the truck bolster or other body member, and the car body, very low down.

For some purposes, such for instance, as for slow speeds in freight service, it may be found advisable to reverse the arrangement of the rockers shown in Fig. 2, that is, to place the said rockers with their relatively high bearing lugs 11ª outward.

What I claim is:

1. The combination with a truck frame and a body member, of lower rocker bearings spring-supported on said truck frame and partaking of the lateral movements thereof, upper rocker bearings partaking of the lateral movements of said body member, and rockers interposed between said upper and lower rocker bearings, said rockers having, at one end, normally engaged bearing surfaces of different projection arranged to raise said body member to one extent under one movement of the rocker, and another extent under another movement of said rockers.

2. The combination with a truck frame and a body member, of lower rocker bearings spring-supported on said truck frame and partaking of the lateral movements thereof, upper rocker bearings partaking of the lateral movements of said body member, and solid rockers interposed between said upper and lower rocker bearings, said rockers having, at one end, normally engaged bearing surfaces of different projection arranged to raise said body member to one extent under one movement of the rocker, and another extent under another movement of said rockers, and the rockers at the opposite side of the truck being reversely arranged so that when said body member is moved laterally or transversely of the truck, one side thereof will be raised faster and to a greater extent than the other.

3. The combination with a truck frame and a body member having a lateral movement in respect thereto, of lower rocker bearings partaking of the lateral movement of said truck frame, upper rocker bearings partaking of the lateral movements of said body member, and three-point rockers interposed between said upper and lower rocker bearings, said rockers, at one end, having normally engaged bearing lugs, one projected vertically more than the other, and the rockers at the opposite sides of the truck being reversely arranged, whereby said body member when moved laterally or transversely of the truck, will be raised faster and to a greater extent at one side of the truck than at the other.

4. The combination with a truck frame and a body member having a lateral movement in respect thereto, of lower rocker bearings partaking of the lateral movements of said truck frame, upper rocker bearings partaking of the lateral movements of said body member, and solid rockers interposed between said upper and lower rocker bearings at the opposite sides of the truck, said rockers, at their upper ends, having bearing lugs, one raised higher than the other, and, having at their lower ends, differentially curved bearing surfaces, and the rockers at the opposite sides of the truck being reversely arranged, whereby, when said body member is moved laterally or transversely of the truck frame, one side thereof will be raised faster and to a greater extent than the other.

5. The combination with a truck frame and a body member having lateral movement in respect thereto, of groups of springs supported on the sides of said truck frame, lower rocker bearings mounted on said groups of springs and having pockets which depend between the inner and outer springs, upper rocker bearings partaking of the vertical and lateral movements of said body member, and solid three-point rockers interposed between said upper and lower rocker bearings and having at their upper ends inner and outer lugs, the former of which are raised higher than the latter, and both of which normally engage said upper rocker bearings, substantially as described.

6. The combination with a truck frame and a body member having a lateral movement in respect thereto, of groups of springs supported on the sides of said truck frame, lower rocker bearings mounted on said groups of springs and having pockets which depend between the inner and outer springs, upper rocker bearings partaking of the vertical and lateral movements of said body member, and solid three-point rockers having at their upper ends inner and outer bearing lugs, the former of which are raised higher than the latter, and having at their lower ends differentially curved bearing surfaces that engage the bottoms of the pockets of said lower rocker bearings, the bearing surfaces of smaller curve being located obliquely opposite to the relatively low outer bearing lugs on the upper ends of said lugs, and the rockers at the opposite sides of the truck frame being reversely arranged, substantially as described.

7. The combination with a truck frame and a bolster, of lower rocker bearings supported by and partaking of the lateral movements of said truck frame, upper rocker bearings applied to the ends of said bolster and partaking of the vertical and endwise movements thereof, and three-point rockers interposed between said upper and lower bearings, said rockers at their upper ends having normally engaged lugs, one raised higher than the other and both normally engaging said upper rocker bearings, the rockers at opposite sides of the truck frame being reversed, whereby said bolster, when moved transversely of the truck, will be raised faster and to a greater extent at one end than at the other.

8. A lateral motion device for car truck bolsters, comprising a rockable bolster-supporting member arranged parallel with the vertical plane in which the bolster moves and being so designed that it will raise the bolster higher when it rocks laterally in one direction than when it rocks laterally in the opposite direction.

9. A lateral motion device for car truck bolsters, comprising a rockable bolster-supporting member arranged parallel with the vertical plane in which the bolster moves and having different portions that serve to support and move the bolster upwardly when said member rocks in opposite directions, said member being so designed that the middle ordinate of the arc described by one of said portions is greater than the middle ordinate of the arc described by the other portion.

10. A lateral motion device for car truck bolsters, comprising a rockable bolster-supporting member having two portions that branch laterally in opposite directions from the fulcrum point of said member, said portions being so designed and arranged that the one which raises the bolster when the bolster moves outwardly will impart a greater degree of upward movement to the bolster than said other portion imparts to the bolster when the bolster moves laterally in the opposite direction.

11. A lateral motion device for car truck bolsters, comprising a rockable bolster-supporting member having two arms that branch laterally from the fulcrum point of said member, said arms being so designed and arranged that the middle ordinate of the arc described by one arm is greater than the middle ordinate of the arc described by the other arm.

12. A lateral motion device for car truck bolsters, comprising a rockable bolster-supporting member having two arms that project laterally in opposite directions from the fulcrum point of said member, one of said arms being longer than the other.

13. A lateral motion device for car truck bolsters, comprising a rockable bolster-supporting member having two arms that project laterally in opposite directions from the fulcrum point of said member, one of said arms being longer than the other, and said arms being so positioned with relation to each other that the shorter arm will impart a greater degree of upward movement to the bolster when it operates than the longer arm imparts to the bolster when it operates.

14. A lateral motion device for car truck bolsters, comprising rockable bolster-supporting members arranged between the under side of the bolster and a supporting structure and designed in such a manner that they cause the outer end of the bolster to raise higher or move upwardly a greater distance than the inner end of the bolster when the bolster moves laterally in rounding a curve.

In testimony whereof I affix my signature in presence of two witnesses.

WILLIAM H. WILSON.

Witnesses:
  A. J. PEARSON,
  JOHN E. HUEGERUH.